US012049910B2

(12) United States Patent
Bujewicz et al.

(10) Patent No.: US 12,049,910 B2
(45) Date of Patent: Jul. 30, 2024

(54) FILTER RETAINING PLUG

(71) Applicant: Hamilton Sundstrand Corporation, Charlotte, NC (US)

(72) Inventors: Maciej Bujewicz, Wrocław (PL); Marek Jedliński, Wrocław (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 179 days.

(21) Appl. No.: 17/195,741

(22) Filed: Mar. 9, 2021

(65) Prior Publication Data
US 2021/0190097 A1 Jun. 24, 2021

Related U.S. Application Data

(62) Division of application No. 16/379,983, filed on Apr. 10, 2019, now Pat. No. 10,975,894.

(30) Foreign Application Priority Data

Apr. 10, 2018 (EP) .................... 18461547

(51) Int. Cl.
F15B 13/04 (2006.01)
B01D 29/05 (2006.01)
(Continued)

(52) U.S. Cl.
CPC ............ F15B 13/04 (2013.01); B01D 29/055 (2013.01); B25B 7/14 (2013.01); B25B 27/06 (2013.01);
(Continued)

(58) Field of Classification Search
CPC ........ B25B 27/28; B25B 27/205; F16B 4/004
See application file for complete search history.

(56) References Cited

U.S. PATENT DOCUMENTS 2,115,109 A * 4/1938 Jones ...................... B25B 27/02
29/278
2,154,867 A * 4/1939 Robinson ................ B25B 27/06
29/267
(Continued)

FOREIGN PATENT DOCUMENTS

CN 203979641 U ‡ 12/2014
CN 203979641 U 12/2014
(Continued)

OTHER PUBLICATIONS

European Search Report for Applicaiton No. 18461547.4-1010, mailed Oct. 22, 2018, 15 pages.‡

Primary Examiner — Angelisa L. Hicks
(74) Attorney, Agent, or Firm — CANTOR COLBURN LLP

(57) ABSTRACT

A plug for retaining a filter screen in a fluid port of a servovalve, comprises an annular body, the annular body comprising: opposed first and second axial end surfaces, a radially inner surface extending between the first and second axial end surfaces, a radially outer surface extending between the first and second axial end surfaces and at least one recess formed in the radially inner surface for receiving a tool for removing the plug from the port. A tool for removing the plug comprises a pair of handles pivotally mounted to one another about a pivot, each handle having a plug gripping portion extending therefrom beyond the pivot, each plug gripping portion comprising an outwardly projecting tooth for engaging in the recess of the plug when the plug gripping portions are moved apart by operation of the handles.

7 Claims, 6 Drawing Sheets

(51) Int. Cl.
*B25B 7/14* (2006.01)
*B25B 27/06* (2006.01)
*B25B 27/20* (2006.01)
*F15B 13/043* (2006.01)
*F15B 21/041* (2019.01)
*F16B 4/00* (2006.01)
*F16K 5/02* (2006.01)
*F16K 5/04* (2006.01)
*F16N 21/06* (2006.01)

(52) U.S. Cl.
CPC .......... *B25B 27/205* (2013.01); *F15B 13/043* (2013.01); *F15B 21/041* (2013.01); *F16K 5/025* (2013.01); *F16K 5/04* (2013.01); *F16N 21/06* (2013.01); *B01D 2201/0423* (2013.01); *F16B 4/004* (2013.01)

(56) References Cited

U.S. PATENT DOCUMENTS

| | | | | |
|---|---|---|---|---|
| 2,792,622 A | ‡ | 5/1957 | Wurzel | B25B 7/18 29/229 |
| 2,851,769 A | * | 9/1958 | Johnson | B25B 27/0042 29/280 |
| 3,206,216 A | * | 9/1965 | Crook | F16J 15/104 210/450 |
| 4,435,112 A | ‡ | 3/1984 | Becker | F16B 5/02 29/453 |
| 4,539,873 A | * | 9/1985 | Freed | B25F 1/003 7/127 |
| 5,023,989 A | * | 6/1991 | Hargrave | B25B 7/02 29/426.5 |
| 5,181,303 A | * | 1/1993 | Gregg | B25B 27/02 29/255 |
| 5,419,368 A | ‡ | 5/1995 | Fiondella | F15B 13/043 137/625.64 |
| 6,021,996 A | ‡ | 2/2000 | Nakayoshi | G05D 16/2097 251/30 |
| 6,170,288 B1 | ‡ | 1/2001 | Incorvia | B01D 29/055 62/474 |
| 6,277,293 B1 | ‡ | 8/2001 | Taylor | B01D 29/15 210/76 |
| 6,648,014 B1 | ‡ | 11/2003 | Takahashi | F15B 13/0438 137/545 |
| 6,694,773 B1 | ‡ | 2/2004 | Snow | F25B 39/04 62/474 |
| 7,141,165 B2 | ‡ | 11/2006 | Cheong | B01D 29/01 210/232 |
| 2003/0173311 A1 | ‡ | 9/2003 | Younger | B01D 29/96 210/79 |
| 2014/0327257 A1 | * | 11/2014 | Vazquez | E04H 4/16 294/24 |
| 2017/0203260 A1 | ‡ | 7/2017 | Kondo | B01D 63/08 |
| 2018/0016986 A1 | ‡ | 1/2018 | Cordatos | F02C 7/224 |
| 2019/0309770 A1 | | 10/2019 | Bujewicz et al. | |

FOREIGN PATENT DOCUMENTS

| | | | | |
|---|---|---|---|---|
| DE | 29920157 U1 | ‡ | 3/2000 | ............ B25B 27/06 |
| DE | 29920157 U1 | | 3/2000 | |
| DE | 202010002526 U1 | ‡ | 5/2010 | ............ B25B 7/02 |
| DE | 202010002526 U1 | | 5/2010 | |
| EP | 1249651 A1 | ‡ | 10/2002 | ......... F15B 13/0438 |
| EP | 1249651 A1 | | 10/2002 | |

\* cited by examiner
‡ imported from a related application

FILTER RETAINING PLUG

CROSS REFERENCE TO RELATED APPLICATIONS

This application is a division of U.S. patent application Ser. No. 16/379,983, filed Apr. 10, 2019, which claims priority to European Patent Application No. 18461547.4 filed Apr. 10, 2018, the entire contents of which are incorporated herein by reference.

TECHNICAL FIELD

The present disclosure relates to plugs which are used to retain a filter in, for example, a servovalve and to tools which may be used in removing such plugs.

BACKGROUND

Servovalves are used in a wide variety of aircraft control systems, for example in fuel and air management systems for operating engine fuel metering valves, active clearance control valves, bleed valves and so on. The operating medium of the servovalve will potentially be contaminated. Accordingly, servovalves are provided with filters. Such filters may include filter screens which are assembled in ports of the servovalve, for example in supply, control or return ports of the valve. These screens act to retain any particles which are large enough potentially to cause potential failure of the valve. For example in a flapper type servovalve, comprising two nozzles and a movable flapper element arranged between them, the total flapper operating total distance may be as small as about 0.2 mm. In such valves, the filter screen will typically act to filter out particles having a nominal size larger than 0.07 mm. Such filter screens can easily become blocked. This necessitates cleaning or removal and replacement of the filter screens. However, this may be difficult as the filter screen is typically retained by a press fitted plug. Removal of this plug is difficult and may cause damage to the servovalve body, requiring the servovalve itself then to require repair.

It would be desirable to provide a system which would mitigate these problems.

SUMMARY

From a first aspect, the present disclosure provides a plug for retaining a filter screen in a fluid port of a servovalve. The plug comprises an annular body. The annular body comprises opposed first and second axial end surfaces, a radially inner surface extending between the first and second axial end surfaces, a radially outer surface extending between the first and second axial end surfaces, and at least one recess formed in the radially inner surface for receiving a tool for removing the plug from the port.

The recess may be an annular recess extending circumferentially around the entire radially inner surface.

The at least one recess may extend perpendicularly to the radially inner surface.

The recess may extend radially into the plug body from the radially inner surface to a depth of from 30-50% of the thickness of the plug body measured between the radially inner and radially outer surfaces of the plug body.

The recess may have a height measured in a direction between the first and second axial end surfaces of 0.25 to 0.43 of the height of the plug body measured in the direction between the first and second axial end surfaces.

The plug body may be made from aluminium.

The disclosure also provides a servovalve comprising a port for receiving a working fluid, a filter screen mounted in the port and a plug in accordance with the disclosure interference fitted in the port to retain the filter screen in the port.

The disclosure also provides a tool for removing a plug in accordance with the disclosure from a port. The tool comprises a pair of handles pivotally mounted to one another about a pivot, each handle having a plug gripping portion extending therefrom beyond the pivot. Each plug gripping portion comprises an outwardly projecting tooth for engaging in the recess of the plug when the plug gripping portions are moved apart by operation of the handles.

The plug gripping portions may be configured such that as the handles are moved towards one another, the plug gripping portions are moved apart.

Each handle may further comprise a stop for limiting the movement of the handles and therefore the movement apart of the plug gripping portions.

Each stop may comprise an L-shaped element.

Each tooth may taper in an outward direction.

Each handle may comprise a first section arranged generally parallel to the first section of the other handle and an angled section extending therefrom to the pivot.

Each plug gripping portion may comprises a proximal portion attached to a respective handle and a distal portion comprising the outwardly projecting tooth, the proximal and distal portions of each plug gripping portion being offset laterally from one another whereby the distal portions of the gripping portions align.

The disclosure also provides a method of maintaining a servovalve comprising a fluid port and a filter screen retained in the fluid port by a plug in accordance with the disclosure interference fitted within the fluid port. The method comprises engaging a removal tool with the at least one recess of the plug body and pulling the plug out of the port using the tool. The removal tool may be a tool in accordance with the disclosure.

DETAILED DESCRIPTION

Figure 1:
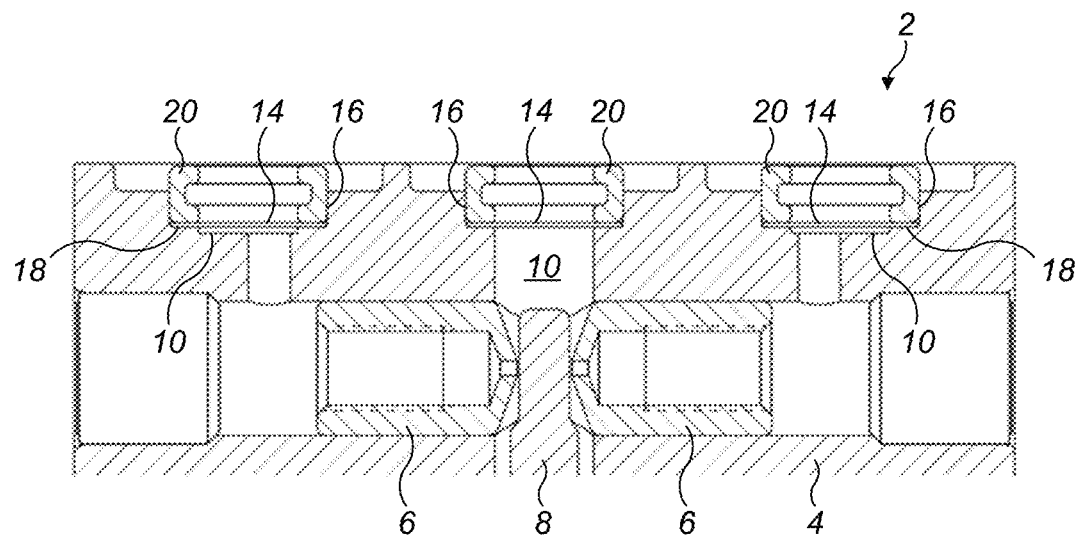
FIG. 1 shows a cross-section through a servovalve in accordance with the disclosure.
Figure 2:
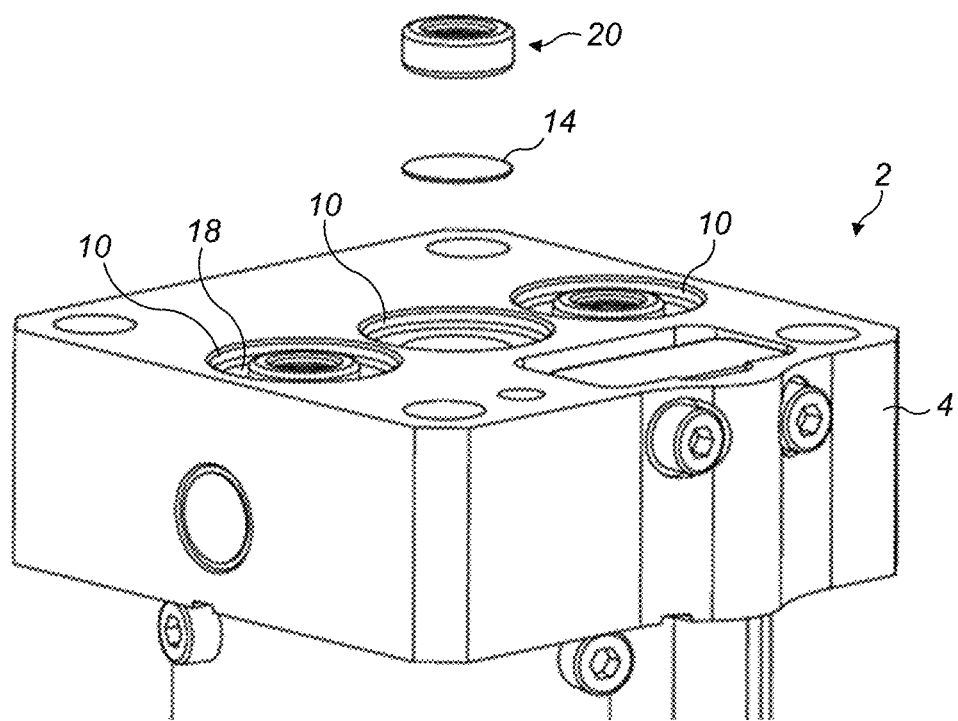
FIG. 2 shows an exploded view of the servovalve of FIG. 1.

With reference to FIGS. 1 and 2, a servovalve 2 comprises a servovalve housing 4 which houses a pair of nozzles 6 and a flapper element 8. As is known in the art, the flapper element 8 is deflected in a direction along the axes of the nozzles 6 by an actuator, not shown, in order to meter a working fluid which passes through the nozzles 6.

The servovalve housing 4 comprises has three ports 10, which allow communication of the working fluid to the nozzles 6. The central port 10 is typically called a control port and its function is to communicate fluid to an actuator (not shown). This type of servovalve is well known in the art, being used in a wide variety of aircraft control systems, for example in fuel and air management systems for operating engine fuel metering valves, active clearance control valves, bleed valves and so on.

Since, as is discussed above, the distances moved by the flapper element 8 may be relatively small, in order to prevent operation of the flapper element 8 being compromised by contamination, particle filters 14 are arranged in one or more of the ports 10. As can be seen in FIG. 1, in an embodiment of the disclosure, the filters 14 are received within a bore 16 of the respective ports 10 and are received on an annular shoulder 18 at the base of each bore 16.

The filter 14 may be a screen or mesh structure as is known in the art, with an appropriate mesh size. For example, in some embodiments the filter 14 may be configured to filter particles having a nominal size larger than 0.07 mm. The filter 14 may be made from any suitable material, for example a metal or a plastics material.

Figure 3:
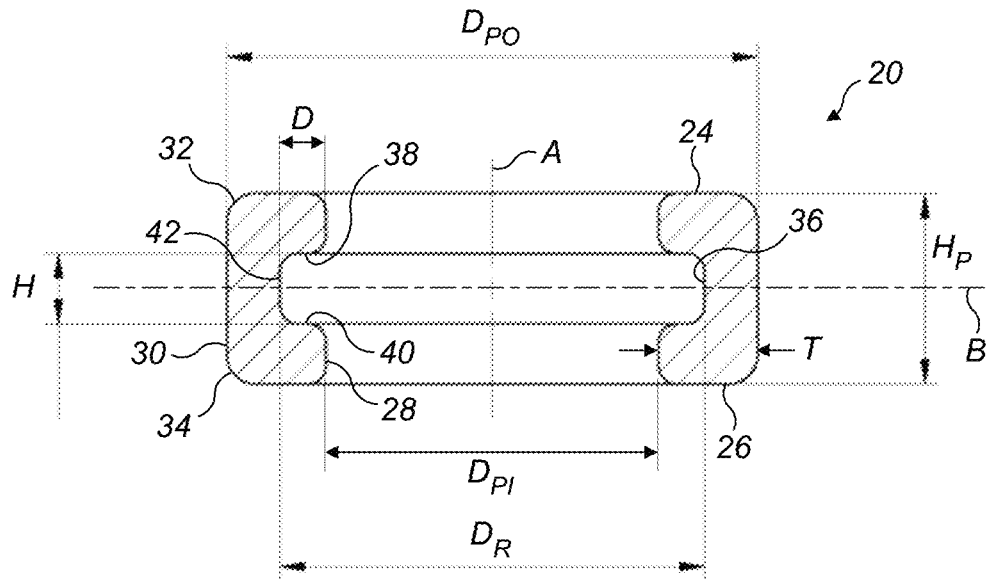
FIG. 3 shows a cross-sectional view of a plug in accordance with the disclosure.
Figure 4:
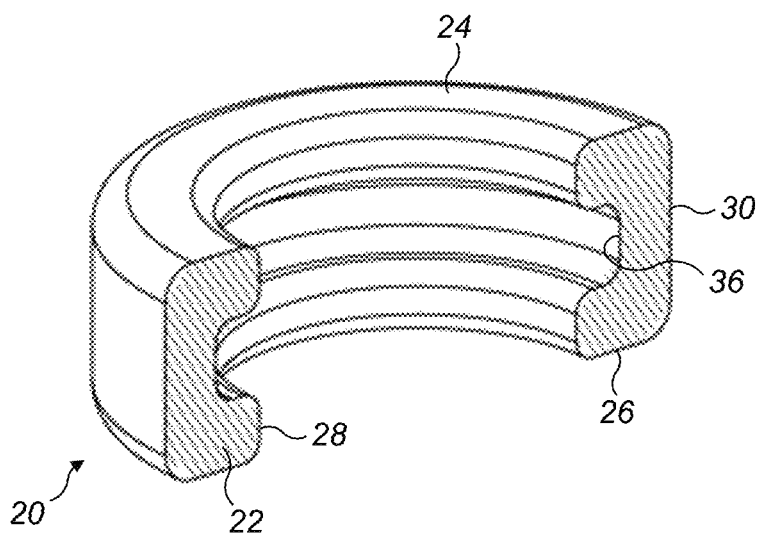
FIG. 4 shows a perspective cross-sectional view of the plug of FIG. 3.

The filter 14 is retained on the shoulder 18 within the bore 16 by a plug 20 which is press fitted into the bore 16. As can be seen in FIGS. 3 and 4, the plug 20 has an annular body 22 having opposed first and second axial end surfaces 24, 26, a radially inner surface 28 extending between the first and second axial end surfaces 24, 26 and a radially outer surface 30 extending between the first and second axial end surfaces 24. The first and second axial end surfaces 24, 26 are generally parallel to one another and perpendicular to the central axis A of the plug 20. The radially inner and outer surfaces 28, 30 are also generally parallel to one another and extend parallel to the central axis A of the plug 20.

An annular recess 36 is formed in the radially inner surface 28. In this embodiment, the recess 36 extends entirely around the circumference of the inner surface 28. In other embodiments, however, one or more pairs of diametrically opposed recesses may be provided instead. However, an annular recess 36 may be more easily manufactured and may facilitate removal of the plug 20.

The recess 36 extends into the plug body 22 generally perpendicularly to the radially inner surface 28. In the disclosed embodiment, the recess 36 has opposed axial surfaces 38, 40 and a base surface 42. The axial surfaces 38, 40 may, as shown, be parallel to the axial end surfaces 24, 26 of the plug body 22. The base surface 42 may be parallel to the radially inner and outer surfaces 28, 30 of the plug body 22.

The recess 36 may extend radially into the plug body 22 from the radially inner surface 28 to a depth D of from 30-50% of the thickness T of the plug body 22 measured between the radially inner and radially outer surfaces 28, 30 of the plug body 22.

The recess 36 may have a height HR measured in the direction between its opposed axial surfaces 38, 40 of from 0.25 to 0.43 of the height HP of the plug body 22 measured between the first and second axial end surfaces 28, 30 of the plug body 22.

In a typical embodiment, the plug body 22 may have an outer diameter DPO of 7.5 mm and an inner diameter DPI of 4.7 mm and the recess 36 have an outer diameter DR of 6 mm. The inner diameter DPI of the plug body 22 will need to be large enough to allow the flow of working fluid through the respective ports 10, 12. The height HP of the plug body 22 may typically be 2.7 mm and the height HR of the recess 36 22 may typically be 1 mm.

As can be seen, for example FIG. 3, in embodiments, the plug 20 may be symmetrical about an axial centreline B defined equidistant between the first and second axial end surfaces 24, 26 of the plug 20 such that it may be inserted into the bore 16 in either orientation, thereby facilitating assembly. Also, as can be seen in FIG. 3, the corners 32, 34 between the first and second axial end surfaces 24, 26 and the radially outer surface 30 may be chamfered or rounded in order to facilitate insertion of the plug 20 into the bore 16.

The plug body 22 may be made from any suitable material. In certain embodiments, the plug body 22 may be made from aluminium for example. This will provide sufficient rigidity and strength for the plug body 22.

As discussed above, the plug body 22 is press fitted into the bore 16 in order to retain the filter 14 in position. The recess 36 facilitates removal of the plug 20 from the bore 16 as will be discussed further below.

Figure 5:
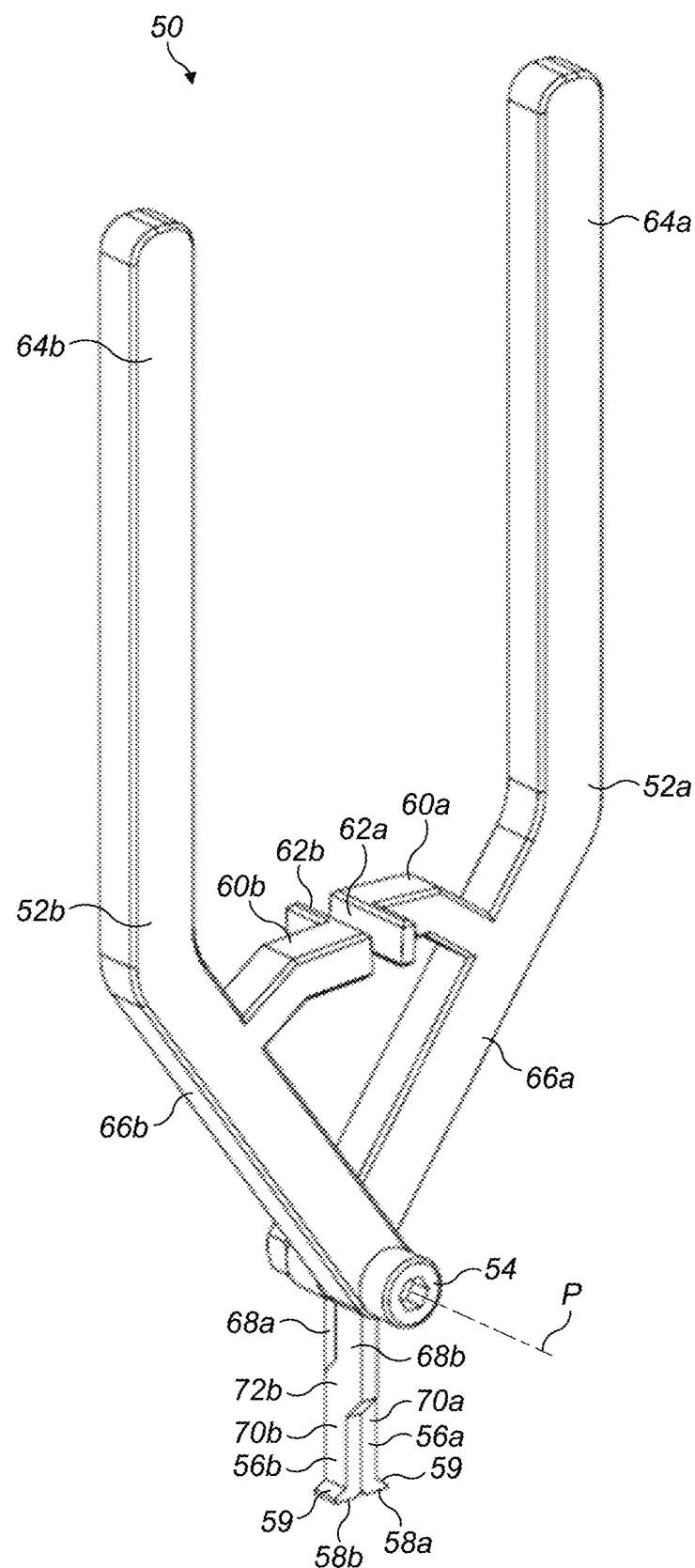
FIG. 5 shows a plug removal tool in accordance with the disclosure.

FIG. 5 illustrates a tool 50 which may be used in removing the plug 20 from a bore 16.

The tool 50 comprises a pair of handles 52a, 52b pivotally mounted to one another about a pivot 54. The pivot 54 may take any suitable form, for example a pin extending through respective openings (not shown) on the handles 52a, 52b. Each handle 52a, 52b has a respective plug gripping portion 56a, 56b extending therefrom beyond the pivot 54.

Each plug gripping portion 56a, 56b comprises an outwardly projecting tooth 58a, 58b at its distal end for engaging in the recess 36 of the plug 20 when the plug gripping portions 56a, 56b are moved apart by operation of the handles 52a, 52b.

The teeth 58a, 58b may have any suitable profile as long as they can be received within the recess 36. In this embodiment, each tooth 58a, 58b tapers in an outward direction. Thus, as shown, the upper surface 59 of each tooth 58a, 58b may be angled. This may facilitate positioning of the tooth 58a, 58b in the recess 36, as can be seen from FIG. 7 for example. Of course other shapes of tooth 58a, 58b are possible within the scope of the disclosure.

In the disclosed embodiment, the plug gripping portions 56a, 56b are configured such that as the handles 52a, 52b are moved towards one another the plug gripping portions 56a, 56b are moved apart. This facilitates removal of the plug 20 as it is possible to engage the tool 50 with the plug 20 using just one hand.

Each handle 52a, 52b further comprises a stop 60a, 60b for limiting the movement of the handles 52a, 52b and therefore the movement apart of the plug gripping portions 56a, 56b. The stops 60a, 60b therefore determine how far the teeth 58a, 58b will extend into the recess 36 and indicate to a user that the teeth 58a, 58b are properly located in the recess 36 when the stops 60a, 60b engage.

In the embodiment described, each stop 60a, 60b is generally L-shaped, having opposed distal surfaces 62a, 62b which will engage with each other in the closed position. Of course, different forms of stop may be provided. In this embodiment, both stops 60a, 60b extend from a respective handle 52a, 52b. In other embodiments, only one stop may extend from a handle 52a, 52b, the other stop being formed as a stop surface on the handle 52a, 52b.

As can be seen from FIG. 5, in this embodiment each handle 52a, 52b comprises a first section 64a, 64b arranged generally parallel to the first section 64a, 64b of the other handle 52a, 52b and an angled section 66a, 66b extending therefrom to the pivot 54. The stops 60a, 60b extend from the angle sections 66a, 66b and are cranked such that the stop surfaces 62a, 62b thereof are generally parallel when they engage one another.

As can also be seen from FIG. 5, each plug gripping portion 56a, 56b comprises a proximal portion 68a, 68b attached to its respective handle 52a, 52b at the pivot 54 and a distal portion 70a, 70b comprising the outwardly projecting tooth 58a, 58b. As the handles 52a, 52b are spaced laterally along the pivot axis P, the plug gripping portions 56a, 56b are shaped such that the proximal portions 68a, 68b and distal portions 70a, 70b are offset laterally from one another in the opposite direction so that the distal portions 70a, 70b of the plug gripping portions 56a, 56b align back to back when the handles 52a, 52b are spaced apart, thereby assuring that the teeth 58a, 58b are aligned. The proximal portions 68a, 68b and 70a, 70b may therefore, as shown, be joined by an angled section 72a, 72b.

Having described the plug 20 and tool 50, removal of a plug 20 from a bore 16 will now be described.

Figure 6:
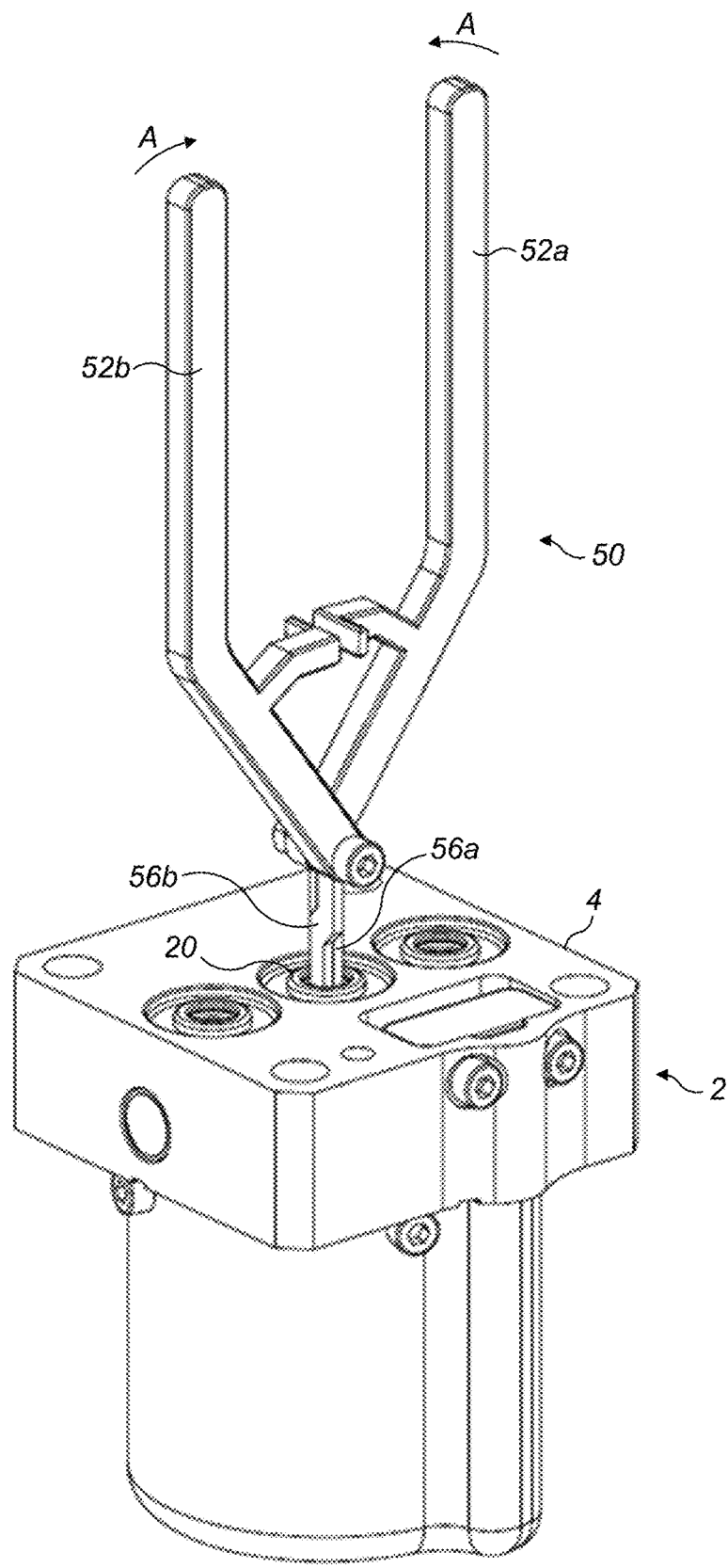
FIG. 6 shows the tool of FIG. 5 in a preliminary stage of removing a plug from a servovalve.

Firstly, with the tool 50 in the "closed" position shown in FIG. 5, the plug engaging portions 56a, 56b are inserted into the plug 20 as shown in FIG. 6. The tool 50 is inserted to such a depth that the teeth 58a, 58b lie opposite the recess 36.

Figure 7:
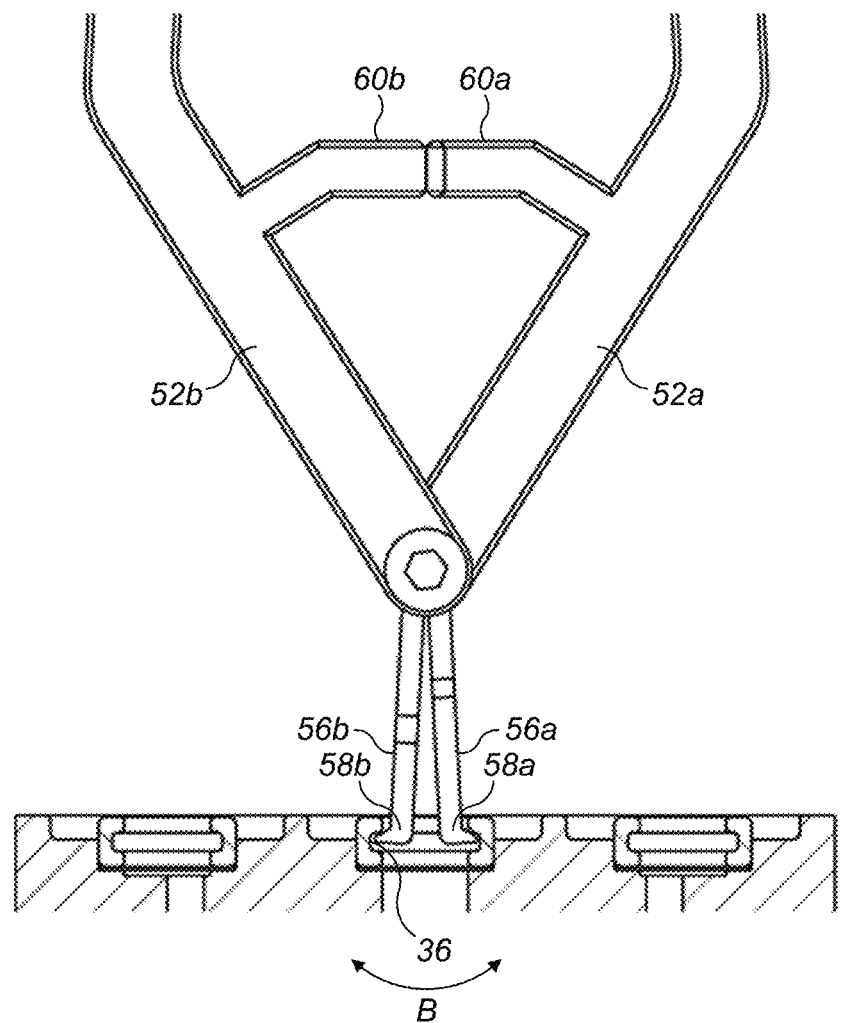
FIG. 7 shows a partial cross-sectional view of the tool in a removal configuration engaged with the plug.

The handles 52a, 52b are then moved together as indicated by arrow A in FIG. 6. This will cause the plug gripping portions 56a, 56b to pivot apart from one another, as shown schematically by the arrow B in FIG. 7. This moves the teeth 58a, 58b into the recess 36 as shown in FIG. 7. The movement of the teeth 58a, 58b is limited by the stops 60a, 60b coming into engagement with each other. This will indicate to the user that the teeth 58a, 58b are fully engaged in the recess 36 and that the plug 20 may then be removed.

Figure 8:
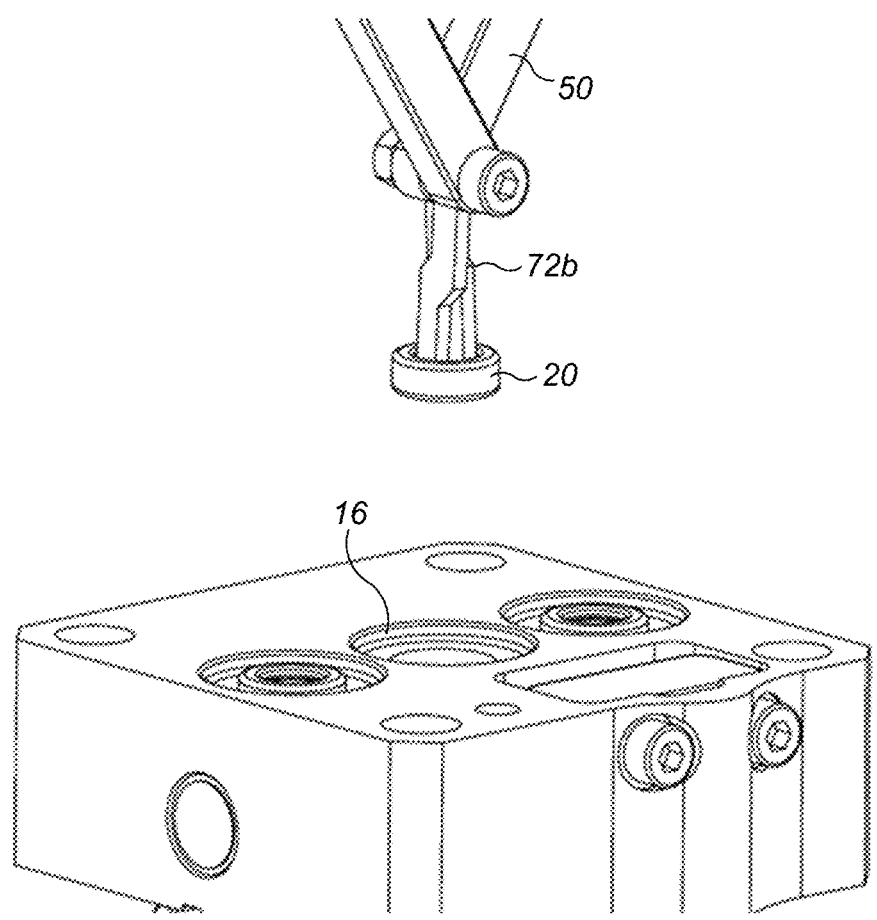
FIG. 8 shows the tool holding the removed plug.

To remove the plug 20, the user pulls on the handles 52a, 52b, and possibly also twists the tool to loosen the plug 20. Once the plug 20 has been removed (as shown in FIG. 8) it may be discarded. The filter 14 may then be removed, for example using a hook-like tool and the relevant port 10, 12 cleaned if necessary. A new filter 14 may then be placed in the bore 16 and a new plug 20 press fitted into the bore 16 to retain the filter 14.

The above described embodiments arrangement offers significant advantages. Firstly, they may allow easy replacement of a filter 14 without the need to return the servovalve 2 to the manufacturer. This is both attractive in terms of time and cost. The tool 50 also allows easy and consistent gripping of a plug 20 to facilitate its removal. The use of an annular recess 36 is potentially advantageous as it will allow the tool 50 to be engaged in the recess in any angular orientation, facilitating removal of the plug 20.

It will be appreciated that the above embodiments are exemplary only and that modifications thereto may be made within the scope of the disclosure.

The invention claimed is:

1. A tool for removing a plug from a port, wherein the plug includes an annular body that comprises: opposed first and second axial end surfaces; a radially inner surface extending between the first and second axial end surfaces; a radially outer surface extending between the first and second axial end surfaces; and at least one recess formed in the radially inner surface for receiving a tool for removing the plug from the port,
wherein the at least one recess is an annular recess extending around the entire radially inner surface and having opposed axial surfaces and a base surface,
wherein the tool comprises:
a pair of handles pivotally mounted to one another about a pivot, each handle having a plug gripping portion extending therefrom beyond the pivot, each plug gripping portion comprising an outwardly projecting tooth for engaging in the recess of the plug when the plug gripping portions are moved apart by operation of the handles,
wherein each handle further comprises a stop for limiting the movement of the handles and therefore the movement apart of the plug gripping portions, each stop comprising an L-shaped element extending from the respective handle.

2. A tool as claimed in claim 1, wherein the plug gripping portions are configured such that as the handles are moved towards one another, the plug gripping portions are moved apart.

3. A tool as claimed in claim 1, wherein each tooth tapers in an outward direction.

4. A tool as claimed in claim 1, wherein each handle comprises a first section arranged generally parallel to the first section of the other handle and an angled section extending therefrom to the pivot.

5. A tool as claimed in claim 1, wherein each plug gripping portion comprises a proximal portion attached to a respective handle and a distal portion comprising the outwardly projecting tooth, the proximal and distal portions of each plug gripping portion being offset laterally from one another whereby the distal portions of the gripping portions align.

6. A tool for removing a plug from a port, wherein the plug includes an annular body that comprises: opposed first and second axial end surfaces; a radially inner surface extending between the first and second axial end surfaces; a radially outer surface extending between the first and second axial end surfaces; and at least one recess formed in the radially inner surface for receiving a tool for removing the plug from the port,
wherein the at least one recess is an annular recess extending around the entire radially inner surface and having opposed axial surfaces and a base surface,
wherein the tool comprises:
a pair of handles pivotally mounted to one another about a pivot, each handle having a plug gripping portion extending therefrom beyond the pivot, each plug gripping portion comprising an outwardly projecting tooth for engaging in the recess of the plug when the plug gripping portions are moved apart by operation of the handles,
wherein each plug gripping portion comprises a proximal portion attached to its respective handle at the pivot and a distal portion comprising the outwardly projecting tooth, wherein the plug gripping portion terminates at the outwardly projecting tooth,
wherein each handle further comprises a stop for limiting the movement of the handles and therefore the movement apart of the plug gripping portions, each stop comprising an L-shaped element.

7. A tool for removing a plug from a port, wherein the plug includes an annular body that comprises: opposed first and second axial end surfaces; a radially inner surface extending between the first and second axial end surfaces; a radially outer surface extending between the first and second axial end surfaces; and at least one recess formed in the radially inner surface for receiving a tool for removing the plug from the port, wherein the at least one recess is an annular recess extending around the entire radially inner surface and having opposed axial surfaces and a base surface, wherein the tool comprises:

a pair of handles pivotally mounted to one another about a pivot, each handle having a plug gripping portion extending therefrom beyond the pivot, each plug gripping portion comprising an outwardly projecting tooth for engaging in the recess of the plug when the plug gripping portions are moved apart by operation of the handles, wherein each handle further comprises a stop for limiting the movement of the handles and therefore the movement apart of the plug gripping portions, each stop comprising an L-shaped element, wherein each handle comprises a first section arranged generally parallel to the first section of the other handle and an angled section extending therefrom to the pivot, each stop extending from the angled section of the respective handle.

* * * * *